INVENTOR.
Harding F. Bakewell,
BY R. W. Smith

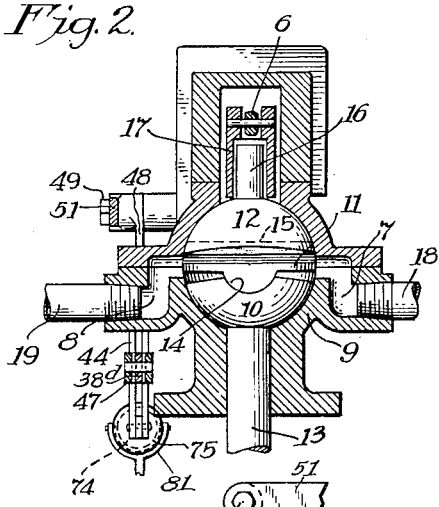

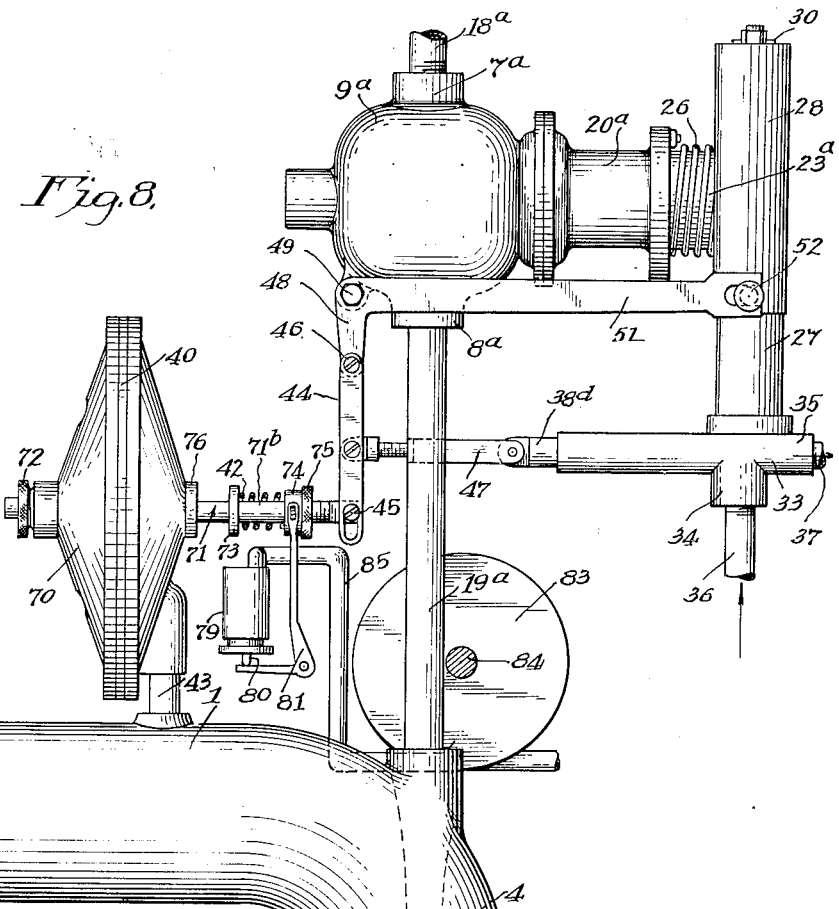

Patented Aug. 17, 1943

2,327,006

UNITED STATES PATENT OFFICE 2,327,006

FLUID SUPPLY REGULATOR

Harding F. Bakewell, San Marino, Calif.

Application August 4, 1940, Serial No. 351,377

6 Claims. (Cl. 123—119)

It is the object of this invention to regulate supply of one fluid to a conduit by the volume of a second fluid passing through the conduit.

It is a further object of the invention to regulate supply of the first fluid by movement of an actuator, with the actuator controlled by pressure and/or velocity of the second fluid so that movement of the actuator is responsive to the volume of the second fluid passing through the conduit.

The invention is particularly applicable to fuel injection for the combustible mixture for an internal combustion engine, the fuel supply being regulated by the volume of air passing through the intake manifold, for maintaining the proper air-fuel ratio.

It is a still further object of the invention to regulate the fuel supply by an actuator movable responsive to admission or relief of actuating pressure which is preferably oil pressure in the usual oil-circulating system of the internal combustion engine, with change in the volume of air which is supplied via the intake manifold admitting or relieving the oil pressure for moving the actuator, so as to regulate the fuel supply in accordance with the air supply and thus maintain the proper air-fuel ratio.

Further objects of the invention will be readily understood from the following description of the accompanying drawings, in which:

Fig. 1 is a side elevation of the invention, showing its use in connection with fuel injection for the combustible mixture for an internal combustion engine.

Figs. 2 and 3 are transverse sections on the lines 2—2 and 3—3 respectively of Fig. 1.

Figs. 5, 6 and 7 are diagrammatic views illustrating operation of the device.

Fig. 8 is a view similar to Fig. 1, showing a modification of the fuel supply regulator.

Fig. 9 is an axial section through that modification of the fuel supply regulator which is shown at Fig. 8.

Figure 1:
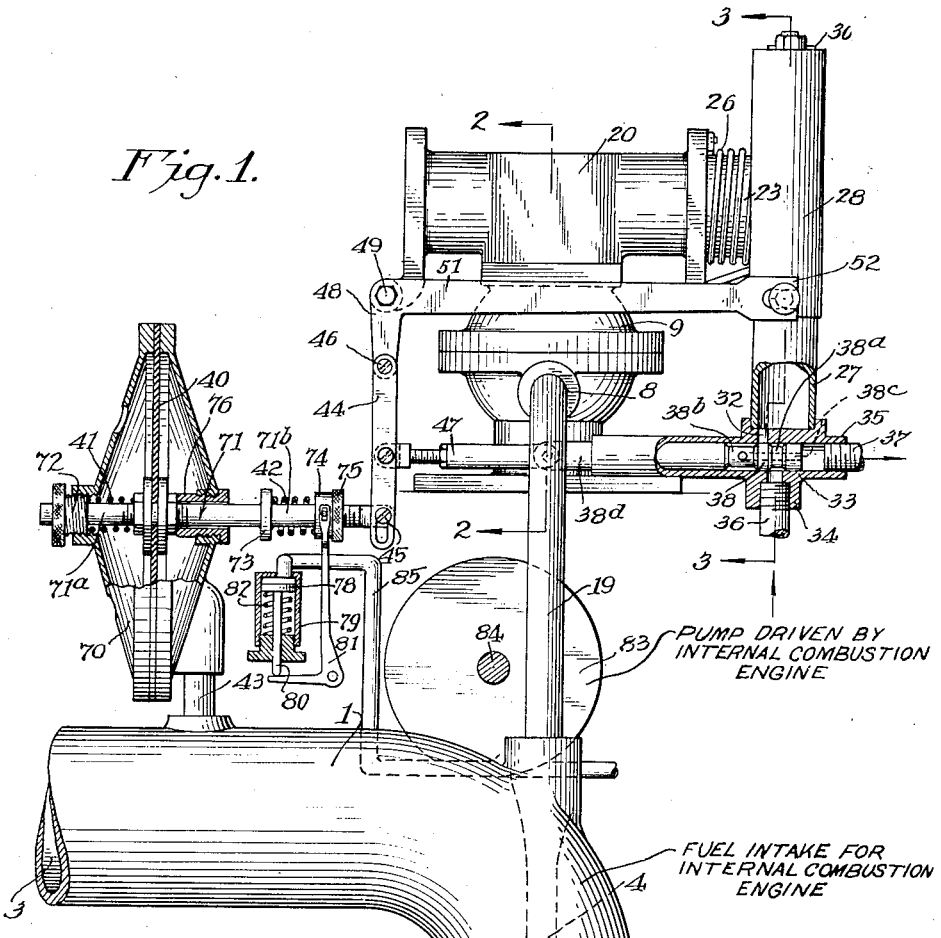

The invention is illustrated and described in its preferred use for regulating fuel injection for the combustible mixture for an internal combustion engine. The intake manifold of the engine is shown at 1. Air is supplied to the intake end 2 of the manifold, and the combustible mixture is discharged to the cylinders of the engine via the outlet end 3 of the manifold. Fuel is injected into the manifold via nozzle 4, so that the injected fuel and the air which is supplied to the manifold form the combustible mixture. The air supply to the manifold may be at atmospheric pressure or may be supercharged, the air supply being regulated in usual manner, e. g. by a usual throttle valve 5 between the intake end of the manifold and the nozzle 4.

The fuel supply to the nozzle 4 is regulated in accordance with the volume of air passing through the manifold 1, so as to maintain proper air-fuel ratio.

As shown at Figs. 1 to 4, the fuel supply may be regulated by a variable-volume pump, which is illustrated as of the type described and claimed in U. S. patent to F. E. Holmes, No. 2,049,775, granted August 4, 1936.

In this type of pump an intake 7 and an outlet 8 communicate with a spherical pump chamber 9. Elements 10—11—12 nest one within another to form a spherical impeller journaled in the chamber 9; the element 10 being rotated by a shaft 13 which is driven by any suitable source of power (not shown); the element 11 being rotatable with the element 10 through a transverse connection 14 which forms a bearing permitting limited rocking of the element 11 relative to the element 10; and the element 12 being rotatable with the element 11 through a transverse connection 15 which is at right angles to the connection 14 and which forms a bearing permitting limited rocking of the element 12 relative to the element 11.

A pin 16 projects from the element 12 and is journaled in a sleeve 17, and the sleeve 17 is pivoted to a rod 6 as shown at 61, the rod 6 being longitudinally shiftable for angularly adjusting the axes of rotation of the elements 10—12. A stop 60 limits this angular adjustment to a range of movement between axial alinement of the axes of rotation of the elements 10—12 and tilting of the element 12 to one side of this axial alinement. When the impeller 10—11—12 is rotated by its drive shaft 13, with the axes of rotation of the elements 10—12 angularly disposed, fluid is drawn in via the intake 7 and is forced around the chamber 9 for discharge via the outlet 8; and angular adjustment of the axes of rotation of the elements 10—12 regulates the volume of fluid which is thus pumped via the outlet 8.

The intake 7 is connected via pipe 18 to a fuel reservoir (not shown), and the outlet 8 is connected via pipe 19 to the nozzle 4. The volume of fuel injected via the nozzle 4 is thus regulated by longitudinally shifting the control rod 6 for varying the angular relation of the axes of rotation of the elements 10—12; and the control rod 6 is shifted responsive to change in the volume of air passing through the manifold 1, so as to maintain the proper air-fuel ratio.

At Figs. 8 and 9 I have shown a modification of the fuel supply regulator, wherein the fuel supply is regulated by a pressure regulator which is adjusted by a cooperating control.

As an instance, the pressure regulator has an intake 7a and an outlet 8a communicating with a valve chamber 9a. A balanced valve 10a is mounted in the chamber 9a and controls communication between its inlet and its outlet. The balanced valve is actuated by a stem 11a which is longitudinally shifted by a diaphragm 12a and a spring 13a. The diaphragm is exposed to pressure at the outlet 8a and tends to open the valve 10a responsive to said outlet pressure; and the spring 13a opposes this outlet pressure and tends to close the valve 10a. The spring 13a abuts a rod 6a which is the control for the pressure regulator and which is longitudinally shiftable for varying the tension of the spring.

The intake 7a is connected via pipe 18a to a fuel supply (not shown) which is maintained at predetermined relatively high pressure, and the outlet 8a is connected via pipe 19a to the nozzle 4. The pressure regulator thus reduces pressure of the fuel supply responsive to adjustment of the valve 10a, and adjustment of this valve is regulated by varying the tension of the spring 13a. The pressure of the fuel supply, and consequently its volume, is thus regulated by longitudinally shifting the control rod 6a for varying the tension of the spring 13a, and the control rod is shifted responsive to change in the volume of air passing through the manifold 1, so as to maintain the proper air-fuel ratio.

The control rod 6 (Figs. 1 to 4) or the control rod 6a (Figs. 8 and 9) is longitudinally adjusted by an actuator which is movable in opposite directions responsive to exertion and relief of actuating pressure, the actuating pressure being preferably oil pressure in the usual oil-circulating system of the internal combustion engine.

As an instance, the control rod is housed in a casing 20 (Figs. 1 to 4) or 20a (Figs. 8 and 9); and a rotatable sleeve longitudinally shifts the control rod relative to its casing. For this purpose, the control rod is fixed against rotation in its casing and is threaded into its cooperating sleeve, the sleeve being journaled on the casing and fixed against longitudinal displacement, e. g. by a bracket 24. The threaded sleeve and the cooperating thread of the control rod are shown at 23—22 (Fig. 4) and at 23a—22a (Fig. 9). The control rod 6 is fixed against rotation in its casing 20 by the pin 61 which pivots the rod 6 to the sleeve 17; and the control rod 6a is fixed against rotation in its casing 20a by a head 61a of the rod, non-circular in cross-section, which is slidable in a corresponding non-circular bore of the casing 20a.

An actuator rotates the threaded sleeve for longitudinally shifting the control rod. The sleeves 23 (Fig. 4) and 23a (Fig. 9) are rotated in the same direction responsive to same direction of movement of the actuator; but the threaded connection 23—22 is threaded opposite to that of the threaded connection 23a—22a. Consequently, in that embodiment of the invention which employs a variable-volume pump for regulating the fuel supply, movement of the actuator in direction for shifting the control rod 6 to the right (Fig. 4), increases the fuel supply by increasing the angular adjustment of the pump elements 10—12; whereas in that embodiment of the invention which employs a pressure regulator for controlling the fuel supply, same direction of movement of the actuator shifts the control rod 6a to the left (Fig. 9), for increasing the fuel supply by increasing the tension of the spring 13a.

Upon movement of the actuator in the opposite direction, the sleeve 23 or 23a is rotated in the reverse direction, preferably by a spring 26; and this reverse rotation of the sleeve 23 shifts the control rod 6 to the left (Fig. 4) for decreasing the fuel supply by decreasing the angular adjustment of the pump elements 10—12, or shifts the control rod 6a to the right (Fig. 9) for decreasing the fuel supply by reducing the tension of the spring 13a.

Movement of the actuator for rotating either the sleeve 23 or 23a (in the same direction) for increasing the fuel supply, is preferably expansive movement of a telescopic cylinder; and the spring 26 rotates either the sleeve 23 or 23a (in the opposite direction) for decreasing the fuel supply, responsive to contraction of the telescopic cylinder. The telescopic cylinder is expanded and contracted by exertion or relief of pressure in the cylinder.

As an instance, the telescopic cylinder comprises a stationary cylinder 27 and a slidable cylinder 28 from which a piston 29 depends into the stationary cylinder; and a flexible connection 30 is fixed at one end to the slidable cylinder 28 and at its opposite end is wrapped around and fixed to either the sleeve 23 or 23a. Pressure in the stationary cylinder 27 against the piston 29 thus expands the cylinder 28 and rotates the sleeve 23 or 23a for increasing the supply of fuel to the nozzle 4; and relieving pressure in the cylinder 27 permits contraction of the cylinder 28, thereby reversely rotating the sleeve 23 or 23a by the spring 26, for decreasing the supply of fuel to the nozzle 4.

Pressure may be exerted or relieved in the cylinder 27 via port 32 which communicates with a valve chamber 33 having an inlet 34 and an outlet 35. Intake and discharge pipes 36—37 communicate respectively with these ports, and in the preferred embodiment of the invention wherein the oil-circulating system of the internal combustion engine provides actuating pressure for the telescopic cylinder 27—28, the pipes 36—37 are connected respectively to the high and low pressure sides of the oil-circulating system (not shown).

A valve 38 is slidable in the valve chamber 33, and when in neutral position as shown at Fig. 1, it closes the port 32 to both the inlet 34 and the outlet 35. When shifted in one direction as shown at Fig. 6, the valve 38 opens the inlet 34 to the port 32 via an annular groove 38a in the valve. Oil is thus admitted to the cylinder 27 and exerts pressure against the piston 29 for expanding the cylinder 28. When the valve 38 is then shifted in the opposite direction until it is again in neutral position, it recloses the port 32 to both the inlet 34 and the outlet 35 as shown at Fig. 7, so that the oil trapped in the cylinder 27 maintains the cylinder 28 in expanded position.

When the valve 38 is shifted in said opposite direction beyond neutral position, it closes the inlet 34 but opens the port 32 to an annular groove 38b in the valve, and this groove communicates with the outlet 35 via a bore 38c in the valve. Oil is thus discharged from the cylinder 27 for relieving pressure against the piston 29 so that the cylinder 28 may telescope. When the direction of movement of the valve 38 is again reversed, i. e. when it is again shifted in the first mentioned direction until it is again in neutral position, it recloses the port 32 to both the inlet 34 and the outlet 35. Relief of pressure is thus arrested with the oil which remains trapped in the cylinder 27 maintaining the cylinder 28 in telescoped position.

Longitudinal shifting of the control rod 6 or 6a, responsive to expansion or contraction of the telescopic cylinders 27—28, is thus controlled by shifting the valve 38; and movement of this valve is controlled by the volume of air passing through the intake manifold 1, i. e. the valve 38 is shifted responsive to change in pressure and/or velocity of the air passing through the intake manifold.

As an instance, a diaphragm 40 is spring tensioned as shown at 41—42. A conduit 43 connects one side of the diaphragm casing 70 with the intake manifold 1 at a point in the manifold between the nozzle 4 and the cylinders of the internal combustion engine, and the opposite side of the diaphragm casing is open to the atmosphere. A rod 71 extends through the diaphragm and is fixed thereto. The spring 41 surrounds one end 71a of the rod, between the diaphragm and an abutment 72 through which the rod-end is slidable, the abutment being threaded to the diaphragm casing for adjusting the tension of the spring 41. This spring 42 surrounds the other end 71b of the rod, between an abutment 73 which is fixed on the rod-end and a yoke 74 which is slidable on the rod-end. An abutment 75 is threaded on the rod-end 71b for limiting relative shifting of the yoke 74 in the direction in which the spring 42 tends to shift the yoke.

By manually adjusting the threaded abutments 72—75, the springs 41—42 are tensioned so that when the internal combustion engine is at rest the diaphragm 40 and the rod 71 are shifted to the right as viewed in the drawings, until arrested in neutral position (Fig. 1) by a manually adjustable stop 76. With the engine at rest and the diaphragm in this neutral position, the spring 42 shifts the yoke 74 into engagement with the abutment 75. The valve 38 is then in closed position as hereinafter described.

When the engine is started the diaphragm 40 and the rod 71 are shifted to the left as viewed in the drawings, to position determined by pressure and/or velocity of air passing through the manifold 1. For example, pressure of air passing through the intake manifold is exerted via conduit 43 against one side of the diaphragm and tends to shift the diaphragm and the rod 71 as shown at Fig. 5 (with the abutment 75 tending to shift the yoke 74 with the rod 71); and mechanism which is shifted proportionally to velocity of air passing through the intake manifold tends to shift the yoke 74 away from the abutment 75 for increasing the tension of the spring 42 and thus increasing the distance which the diaphragm and the rod are shifted, so that total shifting of the diaphragm and rod (as shown at Fig. 6) is proportional to the resultant of pressure and velocity of air passing through the intake manifold 1.

As an instance of means for shifting the yoke 74, a piston 78 is adapted for reciprocation in a cylinder 79, and its piston rod 80 abuts one leg of a bell crank lever 81, the other leg of which is connected to the yoke 74. Pressure is exerted against one face of the piston 78 by a pump 83 which generates pressure proportionally to the speed of its drive shaft 84, and this pressure is opposed by an adjustable spring 82 which tends to oppositely shift the piston 78. By a driving connection (not shown), the shaft 84 is driven at a speed proportional to the speed of rotation of the internal combustion engine with which the intake manifold 1 communicates; and since the speed of rotation of the engine is proportional to the velocity of air passing through its intake manifold, the pressure generated by the pump 83 and exerted via conduit 85 against the piston 78, is proportional to the velocity of air passing through the intake manifold.

The spring 82 is manually adjusted so that with the engine at rest, and with the pump 83 thus idle so that no pressure is exerted via conduit 85, the piston 78 is fully retracted, permitting shifting of the bell crank lever 81 so that the spring 42 shifts the yoke 74 into engagement with the abutment 75. When the engine is running and the pump 83 is thus operated so as to generate pressure against the piston 78, this pressure shifts the piston against the tension of its spring 82, thereby swinging the bell crank lever 81 so as to shift the yoke 74 away from the abutment 75.

The rod 71 is connected to the valve 38 for shifting the valve responsive to movement of the rod, i. e. for shifting the valve proportionally to volume of air passing through the intake manifold 1. As an instance, the rod-end 71b is connected to a lever 44 at a pivot 45, with the opposite end of the lever pivoted at 46; and a link 47 connects the lever 44 and the stem 38d of the valve 38. The pivot 46 is on one leg of a bell crank lever 48 which is pivoted at 49 to the casing 20 (Figs. 1 to 4) or 20a (Figs. 8 and 9); and the other leg of the bell crank lever is extended as shown at 51 and is connected to the telescopic cylinder 28 as shown at 52.

Figure 4:
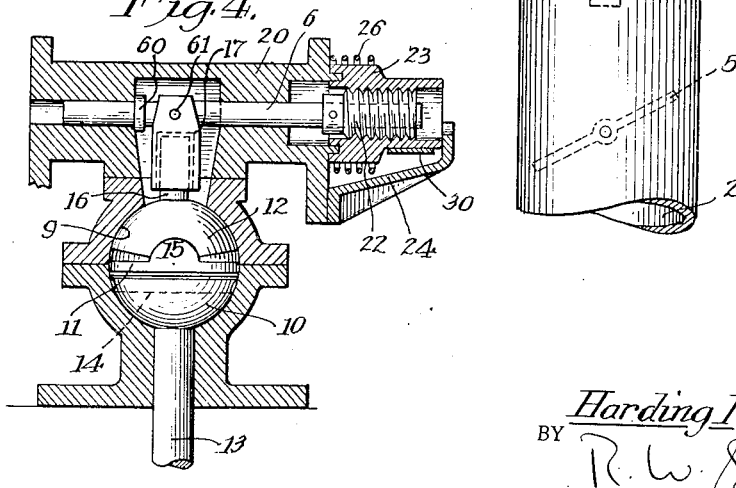
Fig. 4 is a section on the line 4—4 of Fig. 3.

As shown at Fig. 1, when the internal combustion engine is at rest, with the diaphragm 40 in neutral position and the yoke 74 engaging the abutment 75, the rod 71 is in position vertically alining the pivots 49—46—45. The valve 38 is then in neutral position closing the port 32, and the cylinders 27—28 are relatively telescoped whereby the control rod 6 or 6a is longitudinally adjusted as shown at Figs. 4 and 9 respectively, so that no fuel is supplied to the nozzle 4.

As shown at Fig. 6, when the engine is started, the diaphragm 40 and the rod 71 are shifted to the left as viewed in the drawings; and as previously described the distance which the diaphragm and rod are shifted is proportional to the resultant of pressure and velocity of air passing through the intake manifold 1, i. e. shifting of the rod 71 is proportional to the volume of air passing through the intake manifold. This shifting of the rod 71 swings the lever 44 at its pivot 46, thereby retracting the link 47 and shifting the valve 38 from its neutral position to position supplying oil pressure to the cylinder 27 via the groove 38a of the valve. The cylinder 28 is thus expanded, thereby longitudinally shifting the control rod 6 or 6a so as to supply fuel to the nozzle 4.

As shown at Fig. 7, this expansion of the cylinder 28 also rocks the bell crank lever 48, thereby swinging the lever 44 at its pivot 45 and thus projecting the link 47 so as to return the valve 38 to neutral position shutting-off admission of oil pressure to the cylinder 27 and trapping the oil which has been admitted to the cylinder.

The time interval between opening the valve 38 by pivotal movement of the lever 44 at its pivot 46 (Fig. 6), and reclosing the valve by pivotal movement of the lever 44 at its pivot 45 (Fig. 7), is thus determined by the distance which the diaphragm 40 and the rod 71 have been shifted proportionally to volume of air passing through the intake manifold 1; and the oil pressure which is effective for expanding the cylinder 28 while the valve 38 is open, and consequently the distance which the cylinder 28 is expanded, is thus a function of the volume of air passing through the intake manifold.

The distance which the cylinder 28 is expanded, with the cylinder then retained in this expanded position by the oil trapped in the cylinder 27, determines the distance which the control rod 6 or 6a is longitudinally shifted for increasing the fuel supply to the nozzle 4. The fuel supply via nozzle 4 is thus regulated proportionately to volume of air passing through the intake manifold 1, so as to provide proper air-fuel ratio.

Until there is a change in the volume of air passing through the intake manifold, the parts remain in the position shown at Fig. 7, providing the proper air-fuel ratio; and when there is a change in the volume of air, the fuel supply is regulated in accordance with the changed volume of air so as to maintain the proper air-fuel ratio.

For example, with the parts in the position shown at Fig. 7, the diaphragm 40 and the rod 71 are shifted a greater distance to the left as viewed in the drawings, proportionally to increased pressure of air passing through the intake manifold 1, i. e. increased pressure exerted via conduit 43 against the diaphragm, and/or proportionally to increased velocity of air passing through the intake manifold, i. e. increased pressure exerted via conduit 85 for shifting the yoke 74 a greater distance away from the abutment 75 so as to increase the tension of the spring 42. In other words, the rod 71 is shifted a greater distance to the left as viewed in the drawings, proportionally to increase in the volume (pressure and/or velocity) of air passing through the intake manifold 1. Thus shifting of the rod first swings the lever 44 at its pivot 46 (Fig. 6) and then swings the lever at its pivot 45 (Fig. 7), for retracting and then projecting the link 47 so as to open and then reclose the valve 38 for admitting and then shutting-off further admission of oil pressure to the cylinder 27. The control rod 6 or 6a is thus longitudinally adjusted for increasing the fuel supply to the nozzle 4, proportionally to the increase in volume of air passing through the intake manifold 1, so as to provide the proper air-fuel ratio for the increased volume of air.

In similar manner, with the parts in the position shown at Fig. 7, the diaphragm 40 and the rod 71 are shifted to the right as viewed in the drawings, proportionally to decreased pressure of air passing through the intake manifold 1, i. e. decreased pressure exerted against the diaphragm via conduit 43, and/or proportionally to decreased velocity of air passing through the intake manifold, i. e. decreased pressure exerted via conduit 85, which permits shifting of the yoke 74 toward the abutment 75 for decreasing the tension of the spring 42. In other words, the rod 71 is shifted to the right as viewed in the drawings, proportionally to decrease in the volume (pressure and/or velocity) of air passing through the intake manifold 1.

This shifting of the rod 71 swings the lever 44 at its pivot 46, in the opposite direction to that in which the lever is swung when the rod 71 is shifted to the left as viewed in the drawings. The link 47 is thus projected, thereby shifting the valve 38 from neutral position to position bleeding oil from the cylinder 27 via the groove 38b and the bore 38c of the valve. The spring 26 then rotates the sleeve 23 or 23a so that the connection 30 retracts the cylinder 28, and this rotation of the sleeve 23 or 23a longitudinally shifts the control rod 6 or 6a for decreasing the fuel supply to the nozzle 4.

The retraction of the cylinder 28 also rocks the bell crank lever 48 in the opposite direction to that in which the bell crank lever is rocked when the cylinder 28 is expanded, thereby swinging the lever 44 at its pivot 45 and thus retracting the link 47 so as to return the valve 38 to neutral position shutting-off admission or relief of oil pressure via the port 32.

The time interval between initiating relief of pressure via port 32, by pivotal movement of the lever 44 at its pivot 46 (in opposite direction to that shown at Fig. 6) and arresting relief of said pressure by pivotal movement of the lever 44 at its pivot 45 (in opposite direction to that shown at Fig. 7), is thus determined by the distance which the diaphragm 40 and the rod 71 have been shifted proportionally to decrease in the volume of air passing through the intake manifold 1; and relief of oil pressure, while the valve 38 is open, and consequently the distance which the cylinder 28 is contracted by the spring 26, is thus a function of the decrease in the volume of air passing through the intake manifold.

The distance which the cylinder 28 is contracted, with the oil which remains trapped in the cylinder 27 then opposing tension of the spring 26 for retaining the cylinder in this contracted position, determines the distance which the control rod 6 or 6a is longitudinally shifted for decreasing the fuel supply to the nozzle 4. The decrease in fuel supply via the nozzle 4 is thus regulated proportionally to decrease in volume of air passing through the intake manifold 1, so as to provide proper air-fuel ratio for this decreased volume of air.

The invention thus provides means whereby with predetermined volume of fluid passing through a conduit, such as air passing through the intake manifold 1, the parts are positioned as shown at Fig. 7, for regulating the supply of a second fluid, such as fuel admitted via nozzle 4, proportionally to the volume of the first fluid, e. g. for proper air-fuel ratio for a combustible mixture; and in the event of increased volume of the first fluid, the link 47 is first retracted and then projected for expanding the cylinder 28 and increasing the supply of the second fluid proportionally to the increased volume of the first fluid, or in the event of decreased volume of the first fluid, the link 47 is first projected and then retracted for contraction of the cylinder 28 so as to decrease the supply of the second fluid proportionally to the decreased volume of the first fluid.

The invention thus provides for maintaining desired ratio of the two fluids, e. g. proper air-fuel ratio for a combustible mixture for an internal combustion engine, with the supply of the second fluid regulated proportionally to volume of the first fluid, as determined by pressure and/or velocity of this first fluid, e. g. as determined by pressure and/or velocity of air which is supplied via the intake manifold 1 for mixture with fuel which is injected via the nozzle 4.

I claim:

1. In combination, pressure-responsive adjusting means for mechanism which regulates delivery of fuel to the intake of an internal combustion engine, a valve for admitting and relieving pressure for shifting the adjusting means, an operating lever for the valve, a second lever shiftable by the adjusting means, and a control shiftable in opposite directions proportionally to increase and decrease in engine speed and/or pressure in the intake, the operating lever being connected to the control and to the second lever so that the valve is respectively shifted to pressure-admitting and pressure-relieving positions responsive to shifting the control in opposite directions and is then returned to shut-off position by movement of the second lever.

2. In combination, pressure-responsive adjusting means for mechanism which regulates delivery of fuel to the intake of an internal combustion engine, a valve controlling pressure for shifting the adjusting means, a control shiftable in opposite directions proportionally to increase and decrease in engine speed and/or pressure in the intake, and an operating connection between the control and the valve.

3. In combination, pressure-responsive adjusting means for mechanism which regulates delivery of fuel to the intake of an internal combustion engine, a valve for admitting and relieving pressure for shifting the adjusting means, a control shiftable in opposite directions proportionally to increase and decrease in engine speed and/or pressure in the intake, and an operating connection between the control and the valve for respectively shifting the valve to pressure-admitting and pressure-relieving positions responsive to shifting the control in opposite directions and for then returning the valve to shut-off position responsive to movement of the adjusting means.

4. In combination, pressure-responsive adjusting means for mechanism which regulates delivery of fuel to the intake of an internal combustion engine, a valve for admitting and relieving pressure for shifting the adjusting means, an operating lever for the valve, a second lever shiftable by the adjusting means, and a control shiftable in opposite directions proportionally to increase and decrease in engine speed and/or pressure in the intake, the operating lever being medially pivoted to the valve and being pivoted at its respective ends to the control and to the second lever so that the valve is respectively shifted to pressure-admitting and pressure-relieving positions responsive to shifting the control in opposite directions and is then returned to shut-off position by movement of the second lever.

5. In combination, adjusting means for mechanism which regulates delivery of fuel to the intake of an internal combustion engine, a control shiftable in opposite directions proportionally to increase and decrease in engine speed and/or pressure in the intake, and means for shifting the adjusting means proportionally to movement of the control.

6. In combination, an adjusting rod for mechanism which regulates delivery of fuel to the intake of an internal combustion engine, a sleeve threaded on the rod for adjusting the same proportionally to rotatable adjustment of the sleeve, a control shiftable in opposite directions proportionally to increase and decrease in engine speed and/or pressure in the intake, and an operating connection for rotatably adjusting the sleeve proportionally to movement of the control.

HARDING F. BAKEWELL.